US011000824B2

(12) United States Patent
Potukuchi et al.

(10) Patent No.: US 11,000,824 B2
(45) Date of Patent: *May 11, 2021

(54) TREATED ACTIVATED CARBON FOR REMOVAL OF AIRBORNE ORGANIC AND INORGANIC CONTAMINANTS

(71) Applicant: Graver Technologies LLC, Glasgow, DE (US)

(72) Inventors: Kartik Potukuchi, West Henrietta, NY (US); Robert W. Rezuke, North Grafton, MA (US)

(73) Assignee: Graver Technologies LLC, Glasgow, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,636

(22) Filed: May 18, 2020

(65) Prior Publication Data

US 2020/0276557 A1 Sep. 3, 2020

Related U.S. Application Data

(62) Division of application No. 15/331,231, filed on Oct. 21, 2016, now Pat. No. 10,688,468.

(60) Provisional application No. 62/244,776, filed on Oct. 22, 2015.

(51) Int. Cl.
| | |
|---|---|
| *B01J 20/22* | (2006.01) |
| *B01D 53/72* | (2006.01) |
| *B01D 53/02* | (2006.01) |
| *B01D 53/04* | (2006.01) |
| *B01D 53/92* | (2006.01) |
| *B01J 20/20* | (2006.01) |

(Continued)

(52) U.S. Cl.
CPC .............. *B01J 20/22* (2013.01); *B01D 53/02* (2013.01); *B01D 53/04* (2013.01); *B01D 53/72* (2013.01); *B01D 53/92* (2013.01); *B01J 20/20* (2013.01); *B01J 20/28035* (2013.01); *B01J 20/3204* (2013.01); *B01D 2252/20431* (2013.01); *B01D 2252/20489* (2013.01); *B01D 2253/102* (2013.01); *B01D 2253/25* (2013.01); *B01D 2257/302* (2013.01); *B01D 2257/304* (2013.01); *B01D 2257/404* (2013.01); *B01D 2257/70* (2013.01)

(58) Field of Classification Search
None
See application file for complete search history.

(56) References Cited

U.S. PATENT DOCUMENTS

| | | | |
|---|---|---|---|
| 4,289,513 A * | 9/1981 | Brownhill | ........... A61F 13/8405 162/158 |
| 4,397,756 A | 8/1983 | Lehmann | |
| 4,517,111 A | 5/1985 | Dorman et al. | |

(Continued)

*Primary Examiner* — Joseph D Anthony
(74) *Attorney, Agent, or Firm* — DeLio Peterson & Curcio LLC; Robert Curcio

(57) ABSTRACT

A filter composition effective in reacting with airborne or gaseous organic impurities, such as formaldehyde. The filter composition is formed from a filter substrate, such as for example, a fibrous web or extruded carbon block, treated with tris-(hydroxymethyl) aminomethane. The unexpected result of this combination is a longer lasting filter capable of adsorbing organic airborne impurities for a much longer period of time than an untreated filter media of the same type. The removal of formaldehyde is presented as an illustrious example.

13 Claims, 2 Drawing Sheets

Concentration verses time for Non-TRIS based impregnated carbon

(51) Int. Cl.
*B01J 20/28* (2006.01)
*B01J 20/32* (2006.01)

(56) References Cited

U.S. PATENT DOCUMENTS

| | | | |
|---|---|---|---|
| 5,288,306 A * | 2/1994 | Aibe | B01D 53/02 |
| | | | 95/141 |
| 5,403,548 A * | 4/1995 | Aibe | E03D 9/052 |
| | | | 422/5 |
| 5,462,908 A * | 10/1995 | Liang | B01D 53/02 |
| | | | 502/401 |
| 5,582,865 A * | 12/1996 | Rezuke | A61L 9/046 |
| | | | 427/244 |
| 5,714,126 A * | 2/1998 | Frund | B01D 53/0415 |
| | | | 422/122 |
| 6,071,479 A | 6/2000 | Marra et al. | |
| 6,093,237 A * | 7/2000 | Keller | B01D 46/0024 |
| | | | 95/287 |
| 6,344,071 B1 | 2/2002 | Smith et al. | |
| 6,684,882 B1 * | 2/2004 | Morine | A61M 16/0666 |
| | | | 128/203.22 |
| 7,052,683 B2 | 5/2006 | Farkas | |
| 10,688,468 B2 * | 6/2020 | Rezuke | B01J 20/20 |
| 2011/0232653 A1 | 9/2011 | Imashiro et al. | |
| 2014/0186243 A1 * | 7/2014 | Li | B01J 20/324 |
| | | | 423/210 |
| 2015/0122719 A1 | 5/2015 | Lombardo et al. | |
| 2017/0239644 A1 * | 8/2017 | Olson | B01D 53/64 |
| 2018/0141023 A1 * | 5/2018 | Ke | B01J 20/28045 |

* cited by examiner

Concentration verses time for
Non-TRIS based impregnated
carbon

TREATED ACTIVATED CARBON FOR REMOVAL OF AIRBORNE ORGANIC AND INORGANIC CONTAMINANTS

BACKGROUND OF THE INVENTION

1. Field of the Invention

This invention generally relates to a filter composition effective in reacting with airborne or gaseous organic and inorganic contaminants, and to the removal of airborne components such as those found in diesel exhaust—sulfur dioxide, nitrogen dioxide, and hydrogen sulfide, to name a few. More specifically, the invention relates to a filter composition capable of removing airborne formaldehyde. Further, the invention provides for a method which irreversibly removes or decreases the amount of airborne organic and inorganic contaminants from the environment.

2. Description of Related Art

Airborne impurities, such a formaldehyde, sulfur dioxide, nitrogen dioxide, hydrogen sulfide, to name a few, represent hazardous concerns that are pervasive in the environment. As an illustrious example, formaldehyde, which is a colorless, strong-odor emitting gas, is often found in aqueous (water based) solutions. Upon condensation, the gas converts to various other forms of formaldehyde (with different chemical formulas) that are of more practical value. Commonly used as a preservative in medical laboratories and mortuaries, formaldehyde is also found in many products such as chemicals, particle board, household products, glues, permanent press fabrics, paper product coatings, fiberboard, and plywood. It is also widely used as an industrial fungicide, germicide, and disinfectant.

Formaldehyde is a stable molecule, formed by adding two hydrogen atoms to a carbonyl group. Chemically, it has the symbol HCHO ($H_2C=O$). It is the carbonyl group or functionality that makes formaldehyde react so well with other molecules. This functionality enables formaldehyde to bind tightly with other molecules, making it an ideal substance for linking substances together to form unique and versatile performance attributes.

Formaldehyde, an organic compound and simplest of the aldehyde, can be oxidized by reaction with industry known reagents such as potassium permanganate and potassium hydroxide/potassium iodide both found to be ineffective. It is the most common aldehyde in the environment. The natural background concentration is <1 $\mu g/m^3$ with a mean of about 0.5 $\mu g/m^3$ (1 ppm=1.25 $mg/m^3$; 1 $mg/m^3$=0.8 ppm (at 20° C. and 1013 hPa)). In urban environments, outdoor air concentrations are more variable and depend on local conditions; annual averages are usually between 1 and 20 $\mu g/m^3$. Short-term peaks, e.g., in heavy traffic or during severe inversions, can range up to 100 $\mu g/m^3$.

The highest levels of airborne formaldehyde have been detected in indoor air, where it is released from various consumer products such as building materials and home furnishings. At least one survey reported formaldehyde levels ranging from 0.10 to 3.68 parts per million (ppm) in homes. Higher levels have been found in new manufactured or mobile homes than in older conventional homes.

The major toxic effects caused by acute formaldehyde exposure via inhalation are eye, nose, and throat irritation, and effects on the nasal cavity. Other effects seen from exposure to high levels of formaldehyde in humans are coughing, wheezing, chest pains, and bronchitis.

Ingestion exposure to formaldehyde in humans has resulted in corrosion of the gastrointestinal tract and inflammation and ulceration of the mouth, esophagus, and stomach.

Formaldehyde can be inhaled as a gas or vapor or absorbed through the skin as a liquid. Exposure to humans may occur during the treatment of textiles and the production of resins. In addition to healthcare professionals and medical lab technicians, groups at potentially high risk include mortuary workers as well as teachers and students who handle biological specimens preserved with formaldehyde or formalin.

Formaldehyde is a poison by ingestion and can be a strong skin irritant. Formaldehyde is easily absorbed through the skin and is the tenth most common cause of dermatitis. Exposure to high airborne concentrations of formaldehyde can lead to severe respiratory irritation and can result in permanent respiratory damage. Exposures to airborne concentrations over 100 parts per million (air ppm) could result in convulsions, coma, or death.

Formaldehyde reacts virtually instantaneously with primary and secondary amines, thiols, hydroxyls, and amides to form methyl derivatives. Formaldehyde acts as an electrophile and can react with macromolecules such as DNA, RNA, and protein to form reversible adducts or irreversible cross-links. Absorbed formaldehyde can be oxidized to formate along three different pathways, and can be exhaled as carbon dioxide or incorporated into biological macromolecules via tetrahydrofolate-dependent one-carbon biosynthetic pathways.

OSHA has determined permissible exposure limits (PEL's) for formaldehyde. Two PEL's have been established for formaldehyde: the 8-hour Time Weighted Average (PEL-TWA=0.75 ppm) and the Short Term Exposure Limit (STEL=2.0 ppm).

Even though many products have the potential for releasing formaldehyde into indoor air, relatively few are responsible for causing significant levels of contamination. Pressed wood products and UFFI (Urea Formaldehyde Foam Insulation) can release formaldehyde at greater rates than other products.

Means by which to remove or lower the levels of airborne formaldehyde have therefore been sought in the prior art. Attempts to reduce formaldehyde levels have been tried at both the manufacturing stage of potential formaldehyde releasing articles and in the ambient where these articles are installed. For example, U.S. Pat. No. 4,397,756 issued to Lehmann on Aug. 9, 1983, entitled "METHOD AND COMPOSITION FOR REDUCTION OF FORMALDEHYDE EMISSION IN WOOD COMPOSITE PANELS PROVIDES FOR A METHOD AND COMPOSITION FOR THE REDUCTION OF FORMALDEHYDE EMISSION IN WOOD PANELS," teaches a composition comprising urea, a carbohydrate based material and an acidic catalyst. U.S. Pat. No. 4,517,111 issued to Dorman, et al., on May 14, 1985, titled "ABSORBENTS FOR AIRBORNE FORMALDEHYDE," provides a composition of matter using a permanganate salt adsorbed or chemisorbed onto a solid alkaline support. This composition can be loose or contained in a container or cartridge means whereby the formaldehyde contaminated atmosphere can be contacted.

U.S. Pat. No. 7,052,683 issued to Farkas on May 30, 2006, titled "COMPOSITION TO DETOXIFY FORMALDEHYDE IN GASEOUS STATE, IN AQUEOUS SOLUTIONS, AND TO PROTECT HUMAN CELL LINES AGAINST FORMALDEHYDE," teaches a chemical compound incorporating a detoxifying combination of substances that are rapidly neutralizing and fixating toxic formaldehyde vapors, forming an adduct with formaldehyde, an enzyme which plays a vital role in the defense against formaldehyde in oral buccal tissue and oral epithelial cell lines.

While increased measures have been taken to reduce exposure to formaldehyde, there is a continuing need to improve methods for controlling small concentrations of gaseous formaldehyde in the environment. It, therefore, would be desirable to develop a filter-type means whereby formaldehyde would be irreversibly retained.

SUMMARY OF THE INVENTION

Bearing in mind the problems and deficiencies of the prior art, it is therefore an object of the present invention to provide an activated carbon filter treated for removing airborne inorganic impurities such as sulfur dioxide, nitrogen dioxide, hydrogen sulfide, and organic impurities such as formaldehyde, to name a few.

It is another object of the present invention to treat a fibrous web substrate with activated carbon impregnated with tris-(hydroxymethyl) aminomethane or TRIS as a means for removing organic and inorganic airborne impurities.

The above and other objects, which will be apparent to those skilled in the art, are achieved in the present invention which is directed to a filter medium for removal of airborne organic contaminants comprising an activated carbon media having a first charge and impregnated with a chemical reagent for removing airborne formaldehyde and/or other aldehydes, while utilizing the activated carbon media for removal of organic compounds.

The chemical reagent may include chemically treating the activated carbon media with a mono-molecular layer of tris-(hydroxymethyl) aminomethane.

The activated carbon media preferably includes a pH altering material that alters the pH of an influent such that microbiological contaminants present in the influent maintain a second charge that is opposite that of the first charge of the activated carbon media.

The activated carbon media may comprise solid composite filter media, fibrous paper media, or nanofiber filter media.

The activated carbon media preferably has a first charge and is impregnated with a chemical reagent for the removal of sulfur dioxide, nitrogen dioxide, and/or hydrogen sulfide.

In a second aspect, the present invention is directed to a process for forming a filter medium for removal of airborne formaldehyde and/or other aldehydes, the process comprising: impregnating activated carbon with tris-(hydroxymethyl) aminomethane; providing a substrate fibrous web (fibrillated nanofibers); depositing the activated, impregnated carbon with particles of a thermoplastic binder on the substrate fibrous web; and fusing the activated, impregnated carbon and the particles of thermoplastic binder to the substrate fibrous web.

The process may include adding a second substrate layer which is bonded to the substrate fibrous web by the thermoplastic binder.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
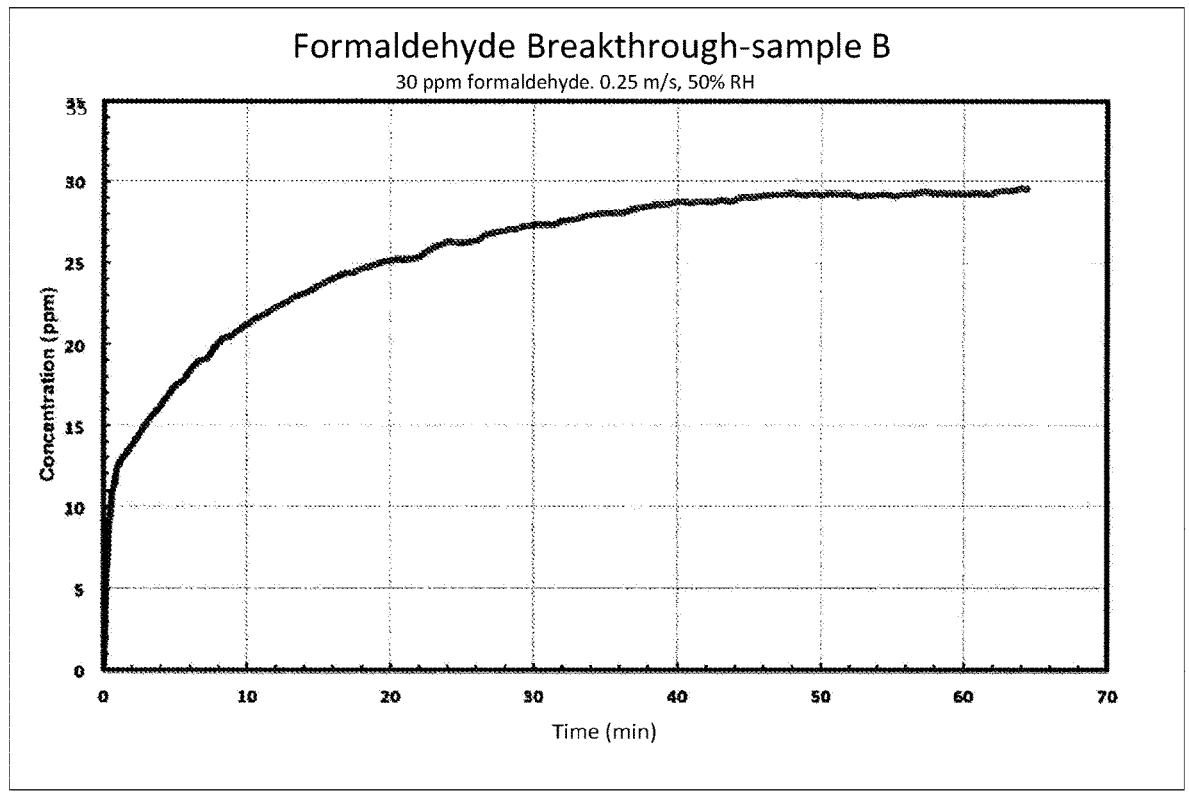
FIG. 1 depicts a graph of the concentration of formaldehyde versus time for non-TRIS based impregnated carbon.

In describing the preferred embodiment of the present invention, reference will be made herein to FIGS. 1-2 of the drawings in which like numerals refer to like features of the invention.

Chemisorption is a type of adsorption that involves a chemical reaction between the surface and the adsorbate. New chemical bonds are generated at the adsorbent surface. Chemisorption occurs when molecules of a volatile pollutant chemically react with the adsorbent's surface to form non-volatile products. This mechanism often allows the capturing of even low boiling point compounds, such as formaldehyde. As a result, filtration capabilities of adsorbent filter mediums, such as carbon composites, can be significantly enhanced by impregnating them with an appropriate chemical reagent. The price paid for the gain in efficiency is the reagent's selectivity. As used herein, "adsorbent filter medium" or "adsorbent prefiltration medium" shall mean a filter medium made with an adsorbent such as, for example, activated carbon. Exemplary of an adsorbent filter medium is PLEKX®, commercially available from KX Technologies LLC of West Haven, Conn.

The present invention combines a composite filter medium, such as an activated carbon filter medium, for example PLEKX®, which generally includes a charged medium and a pH altering material that alters the pH of an influent such that microbiological contaminants present in the influent maintain a first charge that is opposite that of the charged medium having a second charge. The charged composite filter medium may be any charged medium known to one of skill in the art, such as solid composite filter media, fibrous paper media, and nanofiber filter media, to name a few.

Using PLEKX® composite filter media as an illustrious example, but without limiting the present invention solely to this type of activated carbon composite media. Activated carbons are high surface area, porous materials used extensively in purification, separation of materials, catalysis and medicine. Activated carbons have high adsorption capacity, surface reactivity and a range of pore sizes; factors that yield useful properties in many applications. Activated carbon can be made from a wide range of source materials: natural products such as coal, coconut shells, wood, peat, or bone, and synthetic materials such as polymers.

The PLEKX® filter media has typically less than 10% moisture content and is comprised of a 50:50 blend of 20×50 mesh activated carbon. An unexpected result was achieved when this composite filter media was chemically treated with a mono-molecular layer of tris-(hydroxymethyl) aminomethane, which is an organic compound with the formula $(HOCH_2)_3CNH_2$.

The addition of TRIS was to establish a filter media for removal of airborne formaldehyde and other aldehydes, while utilizing the base activated carbon for removal of organic compounds. The TRIS reacts with aldehydes such as formaldehyde to form an oxazolidine compound, with two molecules of the aldehyde reacting with TRIS to form the oxazolidine, providing a high performance adsorbent for air purification.

The reaction of formaldehyde with the TRIS reagent is an example of a carbonyl compound with an ammonia derivative. The reaction class results in a bonding of the carbonyl carbon to the amine nitrogen and may be used for the collection and characterization of aldehydes and ketones.

This newly treated activated carbon will also react with the components of diesel exhaust such as sulfur dioxide, nitrogen dioxide, and hydrogen sulfide.

Flat sheet test data demonstrates the superior performance of TRIS based composite versus traditional (KI impregnated) activated carbon. FIG. 1 is a graph of the concentration of formaldehyde versus time for non-TRIS based impregnated carbon. FIG. 2 is a graph of the concentration of formaldehyde versus time for TRIS-based impregnated carbon. In both cases, the initial airborne formaldehyde concentration was established at 30 ppm, 50% relative humidity, and delivered at a rate of 0.25 m/s.

In FIG. 1, the non-treated (non-TRIS based) impregnated carbon will saturate and no longer provide formaldehyde filtering capacity in about 50 to 60 minutes. In this timeframe, the initial concentration of airborne formaldehyde will be at approximately the same level downstream of the activated carbon filter (30 ppm).

Figure 2:
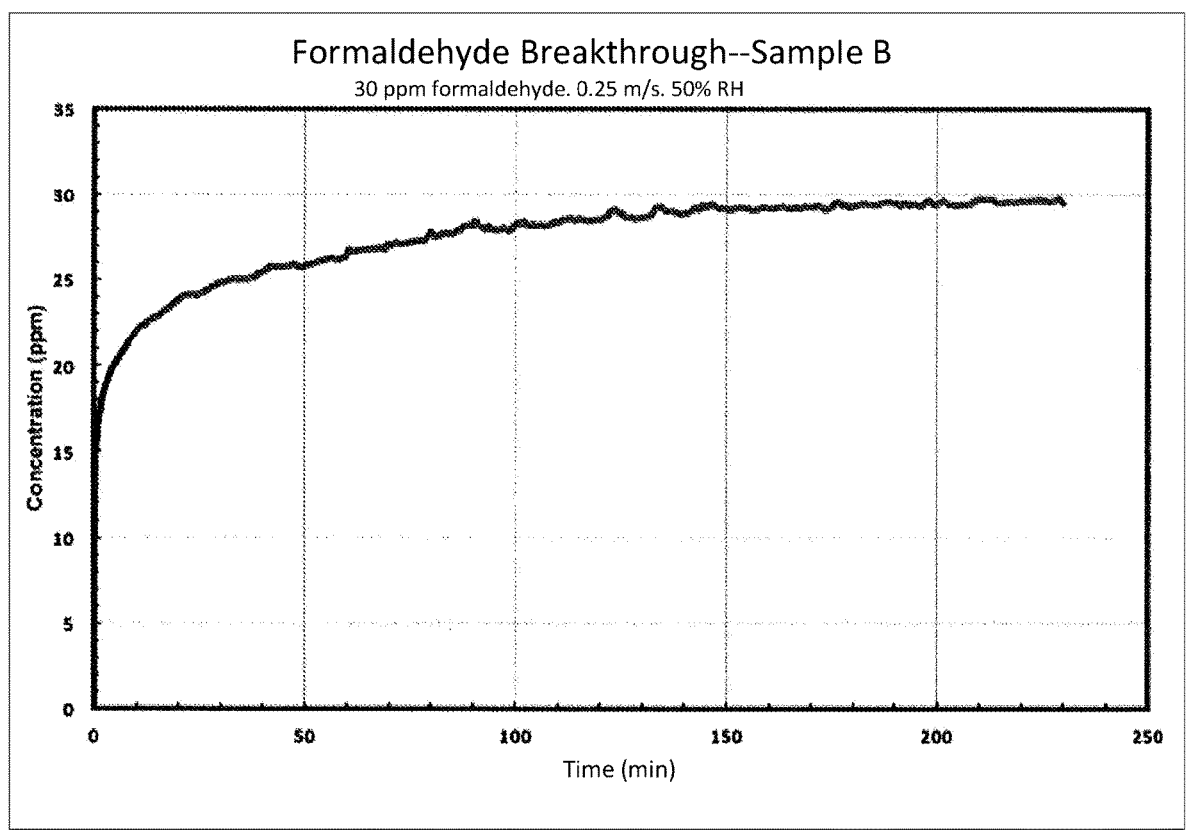
FIG. 2 depicts a graph of the concentration of formaldehyde versus time for TRIS-based impregnated carbon.

In FIG. 2, the treated (TRIS-based) impregnated carbon is used as the filter media. The saturation or formaldehyde breakthrough point does not occur until 150 to 240 minutes, which means the treated carbon filter is three to four times more effective at removing airborne formaldehyde than an untreated carbon filter. This is an unexpected result in the combination of a composite filter media chemically treated with a mono-molecular layer of tris-(hydroxymethyl) aminomethane.

The process for treating the activated carbon filter, which is preferably in paper form, includes providing a first substrate fibrous web, for example comprised of fibrillated nanofibers. Next, activated (impregnated) carbon is deposited along with particles of a thermoplastic binder, which is fused to the first substrate fibrous web and the impregnated carbon. The impregnate carbon is impregnated with tris-(hydroxymethyl) aminomethane.

The web may further include a second substrate layer which is bonded to the first substrate by the thermoplastic binder.

The formed web of fibrous paper with activated carbon impregnated with TRIS gives the advantage of using lower basis weight of the composite to achieve formaldehyde removal efficiency equal to or greater than the efficiency of other available products in the market which use a heavier basis weight of activated carbon.

As noted previously, the treated activated carbon filter will also react with components of diesel exhaust, such as sulfur dioxide, nitrogen dioxide, and hydrogen sulfide Enhanced filtration unexpectedly resulted from the combination of activated carbon with TRIS on these airborne impurities as well.

While the present invention has been particularly described, in conjunction with a specific preferred embodiment, it is evident that many alternatives, modifications and variations will be apparent to those skilled in the art in light of the foregoing description. It is therefore contemplated that appended claims will embrace any such alternatives, modifications and variations as falling within the true scope and spirit of the present invention.

Thus, having described the invention, what is claimed is:

The invention claimed is:
1. A process for forming a filter medium for removal of airborne organic and inorganic contaminants, said process comprising:
providing a substrate fibrous web having an exposed surface;
providing an activated carbon having a first charge;
impregnating said activated carbon with a chemical reagent for removing airborne formaldehyde and/or other aldehydes, to form activated, impregnated carbon;
depositing particles of a thermoplastic binder on said activated, impregnated carbon to form a binder-carbon combination;
depositing said binder-carbon combination on said substrate fibrous web; and
fusing said binder-carbon combination to said substrate fibrous web.

2. The process of claim 1 wherein said step of impregnating said activated carbon includes impregnating said activated carbon with said chemical reagent of tris-(hydroxymethyl) aminomethane.

3. The process of claim 1 wherein said step of providing said substrate fibrous web includes providing a substrate fibrous web of fibrillated nanofibers.

4. The process of claim 1 wherein said step of providing said substrate fibrous web includes providing a fibrous paper media.

5. The process of claim 1 including:
adding a pH altering material, separate from said chemical reagent, and
using said pH altering material to alter the pH of an influent such that microbiological contaminants present in the influent maintain a second charge that is opposite that of the first charge of said activated carbon.

6. The process of claim 1 including adding a second substrate layer which is bonded to said substrate fibrous web by the thermoplastic binder.

7. The process of claim 6 wherein said second substrate layer includes a polypropylene, polyester, and/or nylon substrate.

8. The process of claim 1 wherein said step of impregnating said activated carbon with a chemical reagent includes providing a chemical reagent capable of removing sulfur dioxide, nitrogen dioxide, and/or hydrogen sulfide.

9. A process for forming a filter medium for removal of airborne organic and inorganic contaminants, said process comprising:
providing a fibrous web filter media comprised of approximately a 50:50 blend of 20×50 mesh activated carbon;
chemically treating said fibrous web filter media with tris-(hydroxymethyl) aminomethane;
depositing particles of a thermoplastic binder on said chemically treated fibrous web filter media to form a binder-fibrous web combination; and
fusing said binder-fibrous web combination to produce said filter medium.

10. The process of claim 9 wherein said activated carbon has a first charge.

11. The process of claim 9 wherein said fibrous web comprises fibrous paper media.

12. The process of claim 9 wherein said fibrous web comprises fibrillated nanofibers.

13. The process of claim 10 including:
adding a pH altering material, separate from said tris-(hydroxymethyl) aminomethane, and
using said pH altering material to alter the pH of an influent such that microbiological contaminants present in the influent maintain a second charge that is opposite that of the first charge of said activated carbon.

* * * * *